United States Patent Office 3,101,444
Patented Aug. 20, 1963

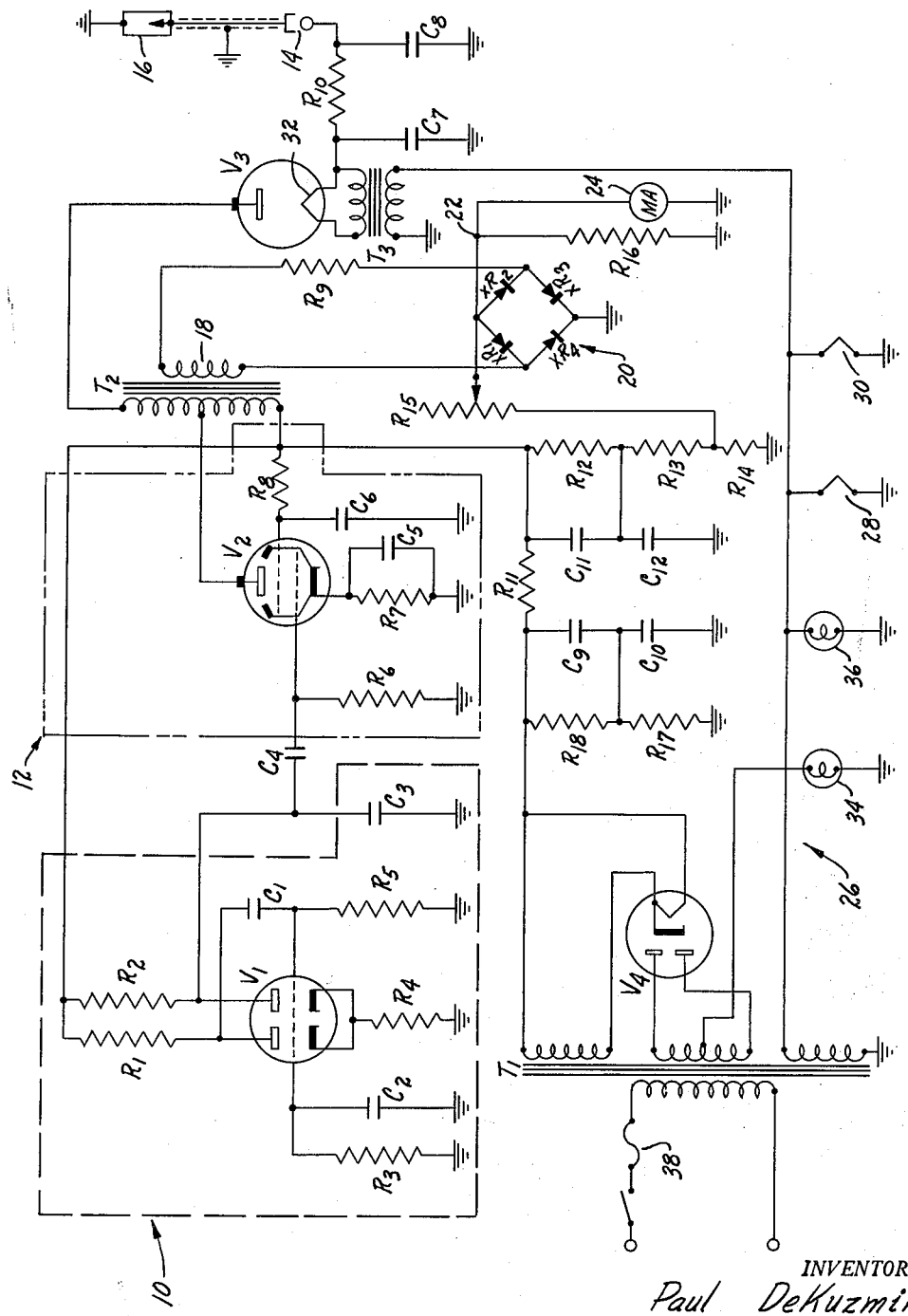

3,101,444
ELECTRONIC PRESSURE MEASURING MEANS FOR INTERNAL COMBUSTION ENGINES RESPONSIVE TO PRESSURE CAUSED SPARK GAP RESISTANCE CHANGE
Paul De Kuzmik, deceased, late of Miami, Fla., by John R. Montgomery, executor, Room 1150, 209 S. La Salle St., Chicago 4, Ill.
Filed June 30, 1959, Ser. No. 824,037
3 Claims. (Cl. 324—33)

This invention relates to means for testing and accurately measuring pressure variations within a closed container, for example in the combustion chamber of an internal combustion engine.

Prior devices used to test and measure compression or pressure within a combustion chamber have required that an opening be formed in the cylinder wall of the engine to be tested and the insertion therein of pressure sensitive devices. Thus the number of engines and cylinders which might be tested was limited. Moreover, the extension into the combustion chamber of the pressure sensitive device, by varying the volume of the combustion chamber and impeding the flame travel, precluded the possibility of obtaining satisfactorily accurate indications of the actual combustion chamber pressures. In an effort to solve these problems devices have been provided wherein pressure sensitive means have been associated with a specially formed spark plug which must then be substituted for the normal spark plug in the combustion chamber to be tested.

One purpose of this invention is to provide a pressure measuring means which does not require modification of the cylinder or combustion chamber of an internal combustion engine.

Another purpose is to provide a pressure measuring means which does not require modification in any manner of the spark plug or other means utilized in firing the internal combustion engine.

Another purpose is to provide a pressure measuring means connectable directly to the ordinary spark plug previously installed in an internal combustion engine.

Another purpose is to provide a pressure measuring means connectable sequentially to each of the spark plugs in an internal combustion engine or to the corresponding leads in the distributor block thereof.

Yet another purpose is to provide a pressure measuring device which will simultaneously indicate the pressure in the combustion chamber of an internal combustion engine and will indicate whether there is a short in the ignition circuit employed with the combustion chamber or any interruption in the lead between the distributor block of the engine and the spark plug of the cylinder under test.

Another purpose of the invention is to provide an electronic compression testing device which may be used to accurately measure pressure variations in the combustion chamber of an internal combustion engine without removing the engine from service.

Other purposes will appear from time to time during the course of the specification and claims.

The invention is illustrated more or less diagrammatically in the accompanying drawing wherein the FIGURE is a schematic showing of the pressure measuring circuit.

Referring now to the drawing, the numerals R–1 – R–18, inclusive, indicate resistors; the numerals V1–V4, inclusive, indicate vacuum tubes; the numerals C1–C12, inclusive, indicate condensers; and the numerals T1–T3, inclusive, indicate transformers.

An electronic oscillator 10, of the multi-vibrator type, generates a sawtooth wave having a frequency of about 8,000 cycles per second which excites a conventional vacuum tube amplifier 12 through a coupling condenser C4, the output of which is applied to a voltage step-up auto transformer T2. The high voltage developed in the transformer T2, after rectification in a vacuum tube V3, is smoothed out by a suitable resistor-condenser filter R19, C7, C8 and applied through a standard ignition harness 14 to the spark plug 16 of the cylinder under test.

The auto transformer T2 has an auxiliary low-voltage winding 18 branched into a conventional bridge rectifier circuit indicated generally at 20 employing small selenium elements XR1, XR2, XR3, and XR4. A direct current at the output 22 of this bridge is applied to a sensitive ammeter 24. The instrument 24, for example, may range from 0 to 50 microamperes and may be calibrated directly in pounds-per-square inch. A shunt resistor R16 is placed in parallel with the ammeter 24 to protect it.

An integral power supply indicated generally at 26 provides alternating current for filament heating of all vacuum tubes plus high D.C. voltage for the plates and screen grids 28 and 30 of the tubes V1 and V2 respectively. This is accomplished by means of a power transformer T1, connected to any 115 volt, 50 or 60 cycle outlet, which in turn is followed by a conventional full wave high vacuum rectifier V4 and a resistor-condenser filtering network R11, R17, R18, C9, C10, C11 and C12. The filament 32 of the high voltage rectifier V3 which may be on the order of an eight kc. rectifier, is fed by transformer T1 through transformer T3 providing the necessary high insulation for the high voltage that is present at the filament 32 of the rectifier V3.

A compensating resistor R15, applies a small direct current voltage of opposite polarity upon the calibrated instrument 24, counteracting the voltage from the selenium rectifier elements of the rectifier bridge 20. It will be understood that this compensating resistor R15, will serve as a zero adjustor of the indicating instrument 24. The compensating resistor R15 is connected to a voltage divider consisting of R12, R13, and R14.

A small panel lamp 34 connected to the high voltage side of transformer T1 serves as a plate supply fuse. A second panel lamp 36 connected to the low voltage lead from transformer T1 acts as an on-off indicator of the 115 volt input which is protected by fuse cartridge 38.

The entire unit may be suitably housed in a relatively small box so that it is easily portable. The indicating instrument 24, directly calibrated in p.s.i., an on-off switch, pilot and fuse lights 34 and 36 and A.C. input and high voltage output connectors may be installed on one panel of the box.

The use and operation of the invention is as follows:
The operation of the device is relatively simple. First the on-off switch is flicked to the on position and thirty seconds are allowed for filament warmup. Following warmup the compensating resistor R15 is used to adjust the indicator instrument 24 for a zero p.s.i. reading with no compression in the cylinder.

The crankshaft of the engine is then turned over either by hand, battery or while under load to start the engine and fire the spark plug. As the pressure inside the cylinder is increased the resistance of the spark gap increases relatively due to the increase in density of the gas within the cylinder which in turn causes a rise of the voltage across the output transformer T2 to make the spark jump the gap and complete the circuit. As the voltage rises at the output auto transformer T2 while the compensating resistor R15 remains at a constant fixed value, the output of the selenium rectifier bridge will increase proportionately to the voltage rise. The direct current at the output 22 of the bridge is applied to the sensitive measuring instrument 24, and the pressure in the cylinder may be read directly since the dial of the measuring instrument will be calibrated directly in pounds per square inch.

It will be understood that if the connection to the spark gap is interrupted or any other circumstance occurs that will introduce a very high resistance in series with the high voltage output from transformer T2, the needle of the measuring instrument 24 will show a maximum deflection. Conversely, a low resistance or even a short circuit in the high voltage output line will cause a reverse indication of the needle since the voltage from the instrument rectifier V3 becomes lower than the counteracting voltage from the compensating circuit rate which is regulated by R15.

The instrument lead can be attached directly to a spark plug and if the spark plug is good, it will indicate the compression present in the cylinder. If the spark plug is shorted out, the measuring instrument will indicate negative pressure.

The instrument can also be connected to any spark plugs through the respective contact points of the distributor block. In this event, if the lead to the spark plug is interrupted, the measuring instrument will show an infinite pressure. Conversely, if there is a short in the lead to the plug the indicator will show negative pressure.

It will be understood that the foregoing description is illustrative only and not definitive. Many variations could be introduced into the system. For example, if it is desired to test the compression in internal combustion engines which must by circumstances run at a fairly high rate of speed, the meter and circuits may be made more responsive to the transient pressure change occurring in the cylinder by the use of more sensitive instruments such as a cathode ray oscilloscope instead of the meter, or a capacitance may be added to the circuit which could be charged over a period of several revolutions and discharged and then in turn be read on the conventional meter.

Accordingly, the invention should not be limited except by the scope of the following appended claims.

What is claimed is:

1. A device for measuring cylinder pressure in an internal combustion engine or the like having an ignition system which includes a spark plug comprising a primary power generating means adapted for connection to a conventional A.C. source of supply, an electronic oscillator capable of generating a signal, means connecting said primary power source and said electronic oscillator, means connected to said oscillator for amplifying the voltage of said signal to a value sufficient to bridge the gap of the spark plug, rectifying means for converting the signal into direct current, means for applying the resultant direct current to the ignition system such as the spark plug, separate means connected to said voltage amplifying means for stepping down the voltage generated thereby, rectifying means connected to said last mentioned means for converting the signal to direct current and measuring the signal voltage direct current produced by the step-down means, the measuring means being calibrated directly in conventional pressure measuring units.

2. The apparatus of claim 1 further characterized by and including compensating means for applying a voltage of opposite polarity to the voltage produced by said step-down means to cancel out the voltage produced thereby when the pressure in the internal combustion engine compression cylinder is atmospheric.

3. A device for measuring cylinder pressure in an internal combustion engine or the like having a spark plug comprising a primary power generating means adapted for connection to a conventional A.C. source of supply, an electronic oscillator connected to said power generating means, said electronic oscillator capable of producing a signal having a frequency of in the neighborhood of about 8,000 cycles per second, a vacuum tube amplifier connected to said oscillator for amplifying said signal, a voltage step-up transformer connected to said amplifier for raising the voltage of said signal to a value sufficient to bridge the gap of the spark plug, rectifying means connected to said transformer for converting said signal into direct current, means for connecting said rectifying means to the spark plug to facilitate delivery of said direct current to said spark plug, an auxiliary low voltage winding extending from said transformer into a bridge rectifier circuit and means for measuring the voltage output of said bridge rectifier circuit in terms of conventional pressure units.

References Cited in the file of this patent

UNITED STATES PATENTS

| | | |
|---|---|---|
| 1,377,282 | Schafer | May 10, 1921 |
| 2,366,355 | Roberts | Jan. 2, 1945 |
| 2,543,141 | Vichnievsky | Feb. 27, 1951 |
| 2,879,450 | Baker | Mar. 24, 1959 |

FOREIGN PATENTS

| | | |
|---|---|---|
| 840,935 | Germany | Apr. 24, 1952 |
| 697,598 | Great Britain | Sept. 23, 1953 |
| 726,741 | Great Britain | Mar. 23, 1955 |